Aug. 8, 1933.　　　H. C. WELLMAN ET AL　　　1,921,554
DRIVE RELEASE AND BRAKE FOR A SPINDLE
Filed Nov. 19, 1931

Howard C. Wellman &
Newton B. Green,
Inventors

By George A. Gillette, Jr.
Attorneys

Patented Aug. 8, 1933

1,921,554

UNITED STATES PATENT OFFICE 1,921,554

DRIVE RELEASE AND BRAKE FOR A SPINDLE

Howard C. Wellman and Newton B. Green, Rochester, N. Y., assignors to Eastman Kodak Company, Rochester, N. Y., a Corporation of New York Application November 19, 1931
Serial No. 576,038

11 Claims. (Cl. 192—12)

The present invention relates to an improvement in a drive for the spindle of a motion picture apparatus and more particularly to a drive which also includes a release and brake for said spindle.

During the winding of a web, such as motion picture film, from one reel to another, and especially during the rewinding of film in a motion picture projector, the increasing diameter of the driven reel decreases the tension in the film or winding moment for the winding reel, since the power drive is substantially constant in ordinary circumstances. It thus becomes quite desirable to control the frictional resistance to the rotation of the spindle carrying the reel being unwound. In motion picture projectors especially, it is necessary that the frictional resistance to rotation of the take-up spindle be susceptible to increase or decrease during rewinding of the film.

The primary object of the present invention is the provision between a pulley and spindle of a connector means which provides a frictional drive between said pulley and spindle.

A further object of the present invenion is the provision between a pulley and spindle of a friction drive which may be released so that the spindle will rotate freely.

Another object of the present invention is the provision between a pulley and spindle of a friction drive which may be manually operated to act as a brake for the spindle.

A still further object of the present invention is the provision between a spindle and a belt driven pulley of a friction drive which may be operated to increase the braking action of the stationary belt upon the rotating spindle.

Still another object of the present invention is the provision between a pulley and spindle of a connector means which includes a pair of telescoping sleeve members, one of which is in frictional engagement with the pulley and the other of which is in frictional engagement with the spindle, thus providing a friction drive between said pulley and spindle.

Other and further objects of the invention will be apparent to those skilled in the art to which this invention applies, as the disclosure thereof is developed hereinafter.

The apparatus by which the above objects are obtained includes a pair of telescoping sleeve members slidably mounted upon a spindle and normally maintained in extended position by a resilient means with one sleeve member in frictional engagement with a pulley freely rotatable upon said spindle and the other sleeve member in frictional engagement with the spindle. The sleeve members may be manually moved together in order to allow the spindle to rotate freely and substantially without friction. Either of the sleeve members may also be manually operated to increase the resistance to rotation presented by a belt drive for the pulley to provide a braking action for the spindle.

Reference is now made to the accompanying drawing in which like reference numerals designate similar elements and in which.

In the illustrated embodiment of the invention, a support arm 10 is integral with a bearing sleeve 11 which contains a pair of bearings 12 made of any suitable bearing metal and located near the ends of the bearing sleeve 11. The spindle 13 is adapted to rotate within the bearing sleeve 11 and in bearings 12. At one end the spindle has the well-known square-round formation for reception of a reel for strip material, such as motion picture film, while at the other end the spindle 13 has a reduced portion 13' of smaller diameter than spindle 13.

Figure 1:
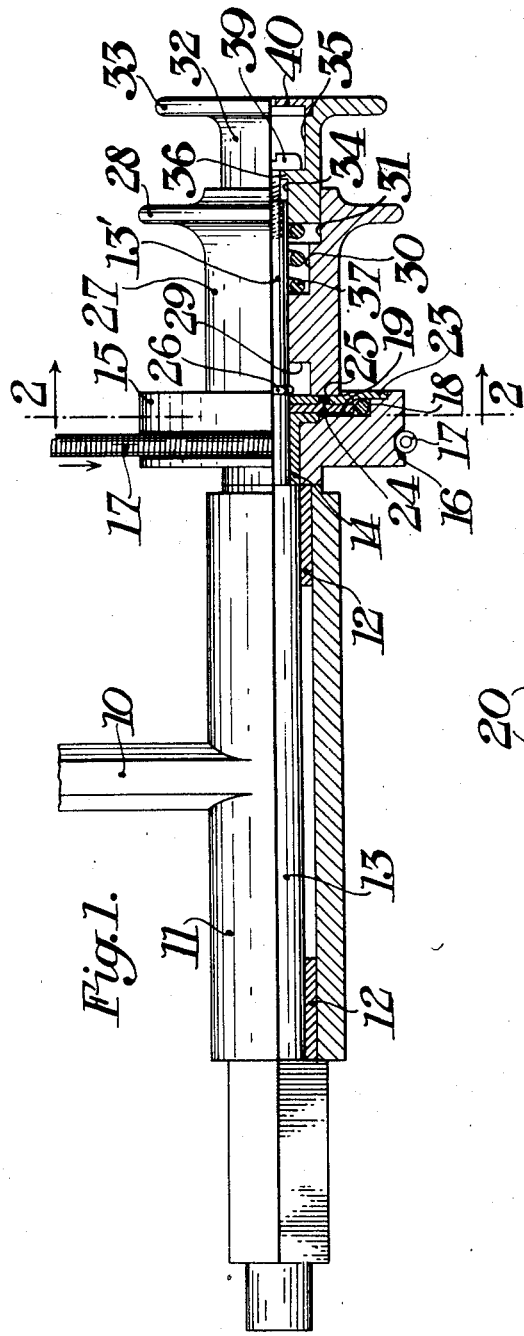
Figure 1 is a plan view of the spindle and drive therefor, according to the invention, with one half shown in cross section.

A bushing 14 is driven onto reduced portion 13' of the spindle and abuts a shoulder formed in the spindle 13. A pulley 15 is mounted to rotate on bushing 14 and has a groove 16 in its periphery to receive a belt 17. The belt 17 may be driven in any suitable manner in the direction indicated by the arrows in Figure 1 and is preferably a spring belt.

Figure 2:
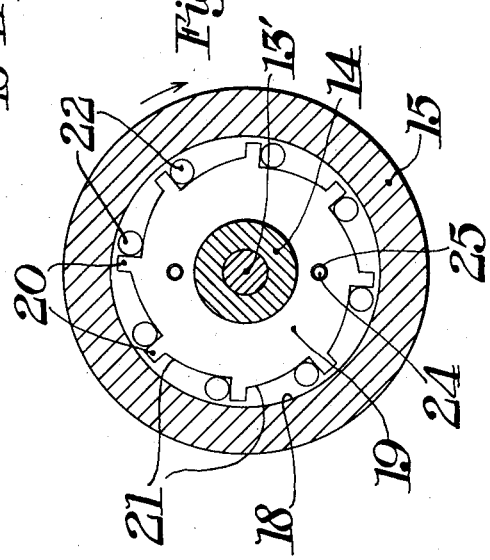
Figure 2 is a transverse cross section through the pulley and spindle taken on the line 2—2 of Figure 1.

The pulley 15 constitutes the casing for a one-way clutch and is recessed to form an annular shoulder 18 therein. A clutch plate 19 is mounted to rotate freely upon the reduced portion 13' of the spindle. The clutch plate 19 has a plurality of teeth 20 and has a plurality of eccentrically curved portions 21 between the teeth 20. Balls 22 are placed between each pair of teeth 20 of clutch plate 19 and upon rotation of the pulley 15 in the direction of the arrow, see Figure 2, the balls 22 bind between the eccentrically curved portions 21 of clutch plate 19 and the annular shoulder 18 of pulley 15 so that the clutch plate and pulley rotate together. During rotation of the pulley 15, in a direction opposite to that indicated by the arrow, the balls 22 will move to the position shown in Figure 2 and the clutch plate 19 will not be positively driven by the pulley 15 although the clutch plate 19 may turn with pulley 15.

A cover plate 23 is mounted on the spindle adjacent clutch plate 19 and is adapted to rotate therewith by means of projections 24 on clutch plate 19 which enter holes 25 in cover plate 23. A retaining ring 26 is located on the reduced portion 13' of the spindle and is adapted to hold the clutch plate 19 and cover plate 23 within the pulley 15. It is especially important that cover plate 23 be held within the pulley 15 or else the balls 22 may move out of position and become jammed between the cover plate 23 or the pulley 15.

The construction as described up to this point is well known and per se constitutes no part of the present invention. In the known constructions, however, the clutch plate 19 or cover plate 23 are directly connected to the spindle 13, whereas, according to the present invention, clutch plate 19 and cover plate 23 are freely rotatable upon the reduced portion 13' of spindle 13.

A connector means which is normally in frictional engagement with the pulley and with the spindle to provide a frictional connection therebetween comprises a pair of telescoping sleeve members normally held in extended position by a resilient means. A sleeve member 27 has a flange 28 and is mounted upon the reduced portion 13' of the spindle to be axially slidable thereon. The sleeve member 27 has a recess 29 at one end thereof to provide a chamber for the retaining ring 26. The other end of sleeve member 27 also has a recess 30 and a larger recess 31.

A second sleeve member 32 has an annular flange 33 and is provided at one end with a recess 34 making a sliding fit with the reduced portion 13' of the spindle and at the other end with a recess 35 so that an internal collar 36 is formed. The second sleeve member 32 has an outside diameter equal to the diameter of recess 31 in sleeve member 27 so that sleeve members 27 and 32 telescope with respect to each other. A resilient means such as a coil spring 37 encircles the reduced portion 13' of the spindle and is located within the recess 30 of sleeve member 27 to make frictional engagement with sleeve member 27 and with one end of sleeve member 32. The coil spring 37 normally holds the sleeve members 27 and 32 in extended position.

The reduced portion 13' of the spindle has another portion of still smaller diameter within which the internal collar 36 is located and which is preferably provided by a threaded stud 38 having a head 39, said stud 38 being only partially screwed into the end of reduced portion 13' of the spindle. The head 39 of stud 38 is located in recess 35 of sleeve member 32. The stud 38 is preferably provided with a left-handed thread so that the relative rotation between the head 39 and internal collar 36 of sleeve member 32 does not screw the stud out of the reduced portion 13' of the spindle. This particular formation of sleeve member 32 and use of stud 38 greatly facilitates assembling of the connector means, as the sleeve members may be telescoped with the coil spring 37 therebetween and the stud 38 threaded into the end of reduced portion 13' after which a cover 40 is frictionally inserted into the end of sleeve member 32.

The operation of the connector means, according to the present invention, is described hereinafter:

During the initial run of the film through the motion picture apparatus the spindle 13 functions as a take-up spindle and is driven by the spring belt 17 in the direction shown. The drive of spring belt 17 is transmitted to the pulley 15, through balls 22, through clutch plate 19, cover plate 23, sleeve member 27, coil spring 37, sleeve member 32, internal collar 36, and stud head 39 to the reduced portion 13' of spindle 13. It should be noted that this drive depends upon frictional engagement in several places but notably upon frictional engagement between cover plate 23 and sleeve member 27 and between internal collar 36 and stud head 39. The resiliency in coil spring 37 will determine the magnitude of the frictional engagement at the two places mentioned. Thus a frictional drive is provided between the pulley 15 and the spindle 13.

During rewinding with the connector means in normally extended position, the clutch plate and connector means will rotate as a unit with the spindle 13 and a certain amount of frictional resistance will be offered to the rotation of spindle 13, depending upon the friction in the bearings 12 and within the clutch pulley. If this frictional resistance is too great for the winding means employed, flanges 28 and 33 may be moved toward each other against the action of coil spring 37, so that sleeve members 27 and 32 float freely upon the reduced portion 13' of the spindle and the only remaining frictional resistance to rotation of the spindle 13 is that in the bearings 12 and in the sliding contact between the reduced portion 13' of the spindle and the internal parts of the sleeve members 27 and 32.

The connector means may function in several different ways as a brake for the spindle during rewinding of the strip material or motion picture film. Such a braking of the spindle is necessary for maintaining an even tension in the strip material being rewound especially if the winding device is jerking or operating too fast. During rewinding the connector means, clutch plate and spindle will all normally rotate as a unit and holding flanges 28 and/or 33 to prevent the rotation thereof will provide some braking action upon the spindle 13. If a greater braking action is desired, flange 33 may be pressed inwardly so that the friction in the clutch pulley, now held stationary by the belt 17, is increased to offer more resistance to the rotation of spindle 13. If still greater braking is necessary, flange 33 is pressed inwardly farther until internal collar 36 abuts the end of reduced portion 13' of the spindle to create a drag thereon corresponding to the pressure exerted and sufficient if necessary to hold the spindle stationary.

Thus it will be seen that the connector means according to the invention may function either as a release for the friction drive or as a brake to apply increased frictional resistance to the rotation of the spindle.

When the connector means is functioning as a friction drive or as a release, the pulley 15 may be considered as a solid pulley freely rotatable upon reduced portion 13' of the spindle. However, the frictional engagement between the cover plate 23 and pulley 15 is utilized during the function of the connector means as a brake although the clutch pulley need not be a one way clutch to allow such utilization.

Many modifications of the present invention are possible without exceeding the scope thereof, and the present disclosure is to be construed in an illustrative and not in a limiting sense.

Having now particularly described our invention, what we claim as new and desire to secure by Letters Patent of the United States is:

1. In a device of the character described, the combination with a spindle and a pulley rotatably mounted thereon, of a connector means adapted to be in frictional engagement with said spindle and said pulley and adapted to be varied in axial extent to change the frictional engagement thereof with said spindle and said pulley.

2. In a device of the character described, the combination with a spindle and a pulley rotatably mounted thereon, of a connector means normally in frictional engagement with said spindle and said pulley and adapted to be varied in axial extent to change the frictional engagement thereof with said spindle and said pulley.

3. In a device of the character described, the combination with a spindle and a pulley rotatably mounted thereon, of a connector means adapted to be in frictional engagement with said spindle and said pulley and adapted to exert a pressure in axial direction to increase the frictional engagements thereof with said spindle and said pulley.

4. In a device of the character described, the combination with a spindle and a pulley rotatably mounted thereon, of a connector means adapted to be in frictional engagement with said spindle and said pulley and adapted to be diminished in axial extent to decrease the frictional engagement thereof with said spindle and said pulley.

5. In a device of the character described, the combination with a spindle and a pulley rotatably mounted thereon, of a pair of telescoping sleeve members slidable on said spindle and with respect to each other and adapted one to make frictional engagement with said pulley and the other to make frictional engagement with said spindle, and a resilient means between said sleeve members and normally extending the same whereby the spindle and pulley are frictionally connected to each other but disconnected upon compression of said sleeve members.

6. In a device of the character described, the combination with a spindle and a pulley rotatably mounted thereon, of a pair of telescoping sleeve members slidable on said spindle and with respect to each other and adapted one to make frictional engagement with said pulley and the other to make frictional engagement with said spindle, and a coil spring encircling said spindle between said sleeve members and normally extending the same whereby the spindle and pulley are frictionally connected to each other but disconnected upon compression of said sleeve members.

7. In a device of the character described, the combination with a spindle, a headed member on the end of said spindle and forming therewith a pair of shoulders in spaced relation, and a pulley rotatably mounted on said spindle, of a sleeve member axially slidable on said spindle and adapted to make frictional engagement with said pulley, a second sleeve member axially slidable on said spindle and having an internal collar adapted to make frictional engagement with either of said shoulders and a coil spring between said sleeve members in frictional engagement therewith and normally extending the same into the respective frictional engagements.

8. In a device of the character described, the combination with a spindle, a stud having a head and partially threaded into the end of said spindle and a pulley rotatably mounted on said spindle, of a sleeve member axially slidable on said spindle and adapted to make frictional engagement with said pulley, a second sleeve member axially slidable on said spindle between two extreme positions and having an internal collar adapted to make frictional engagement with the end of the spindle in one extreme position and with the head of said stud in the other extreme position, and a coil spring between said sleeve members in frictional engagement therewith and normally extending the same respectively into frictional engagement with said pulley and the head of said stud.

9. In a device of the character described, the combination with a spindle and a pulley rotatably mounted thereon, of a sleeve member axially slidable on said spindle and adapted to make frictional engagement with said pulley, a second sleeve member axially slidable on said spindle and adapted to make frictional engagement therewith, and a resilient means in frictional engagement with said sleeve members and holding the same in respective frictional engagements whereby the action of the resilient means may be opposed or aided to decrease or increase the frictional engagements of said sleeve members with the spindle and pulley.

10. In a device of the character described, the combination with a spindle and a pulley rotatably mounted thereon, of a sleeve member having a flange, being axially slidable on said spindle and adapted to make frictional engagement with said pulley, a second sleeve member having a flange, being axially slidable on said spindle and adapted to make frictional engagement therewith and a resilient means between and in frictional engagement with said sleeve members and holding the same in respective frictional engagements whereby compression of said flanges or the exertion of a separating pressure between said flanges will decrease or increase, respectively, the total friction between said spindle and said pulley.

11. In a motion picture apparatus, the combination with a spindle, a pulley including a clutch plate rotatably mounted on said spindle, and a belt in frictional engagement with the periphery of said pulley and adapted to be stationary during rewinding of the film on the apparatus, of a sleeve member axially slidable on said spindle and adapted to make frictional contact with the clutch plate of said pulley, a second sleeve member axially slidable on said spindle and adapted to make frictional enagagement therewith and a resilient means between said sleeve member and in frictional engagement therewith whereby axial movement of said sleeve members toward each other allows the spindle to rotate freely during rewinding of the film on the apparatus while movement of the sleeve members away from each other causes the frictional engagement between the pulley and the belt to give a braking action.

HOWARD C. WELLMAN.
NEWTON B. GREEN.